US006490114B1

(12) United States Patent
Gill et al.

(10) Patent No.: US 6,490,114 B1
(45) Date of Patent: Dec. 3, 2002

(54) METHOD OF SYNCHRONIZING PHYSICAL AND LOGICAL POSITIONS IN A MAGNETIC TAPE RECORDING DEVICE

(75) Inventors: Richard A. Gill, Arvada, CO (US); Robert Olin Wyman, Longmont, CO (US); Benjamin Joseph Baron, Boulder, CO (US); Randy Allen Fout, Lyons, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/365,373

(22) Filed: Jul. 30, 1999

(51) Int. Cl.[7] .......................... G11B 15/18; G11B 19/02
(52) U.S. Cl. ........................ 360/72.2; 360/69; 360/71
(58) Field of Search ........................ 360/71, 72.1, 72.2, 360/72.3, 69

(56) References Cited

U.S. PATENT DOCUMENTS 5,388,016 A * 2/1995 Kanai et al. ............... 360/72.1
5,543,977 A * 8/1996 Shih et al. .................. 360/48
5,889,916 A   3/1999 Kimura et al. .............. 386/52

FOREIGN PATENT DOCUMENTS

EP   0 482 297   4/1992
EP   0 509 637   10/1992
JP   02 195575   10/1990

* cited by examiner

Primary Examiner—Andrew L. Sniezek
(74) Attorney, Agent, or Firm—Brooks & Kushman P.C.

(57) ABSTRACT

An improved tape storage device having information for converting longitudinal physical positions written in a medium to logical positions used by a tape drive. The conversion information, an offset and an optional maximum physical position value, are stored in one or more locations in the tape storage device. Methods of operating the tape drive are disclosed to determine and store the conversion information in the tape storage device. Another method of operation enables the tape drive to read the conversion information and convert the physical positions to logical positions. The method works for both center loading and end loading medium. Possible numeric rollover of the physical positions is detected by one of several methods including the step values between adjacent physical positions, comparing the logical positions with an upper and lower boundary, and generating a lookup table where the rollover is represented by a wraparound between the top and bottom of the table.

22 Claims, 5 Drawing Sheets

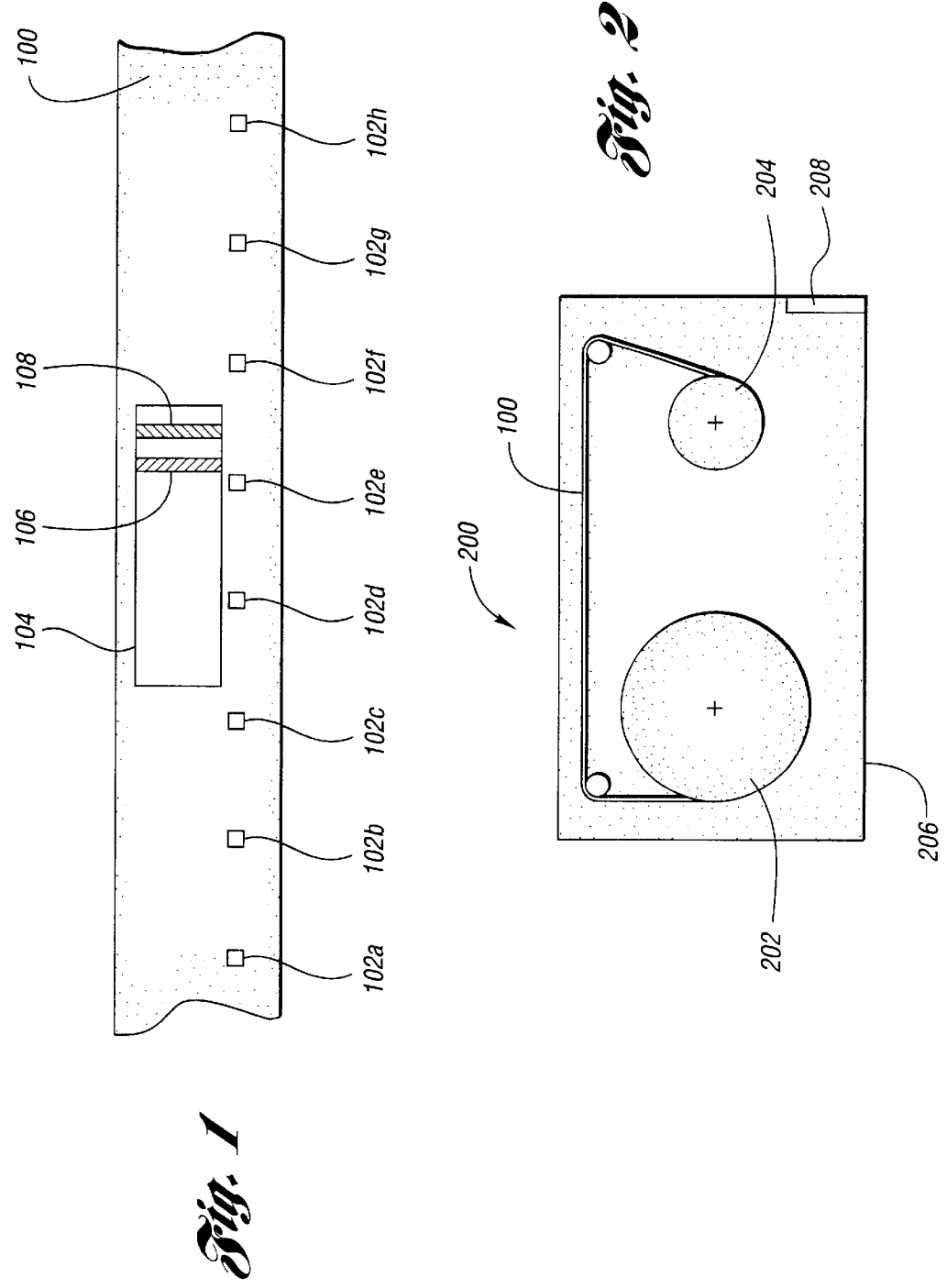

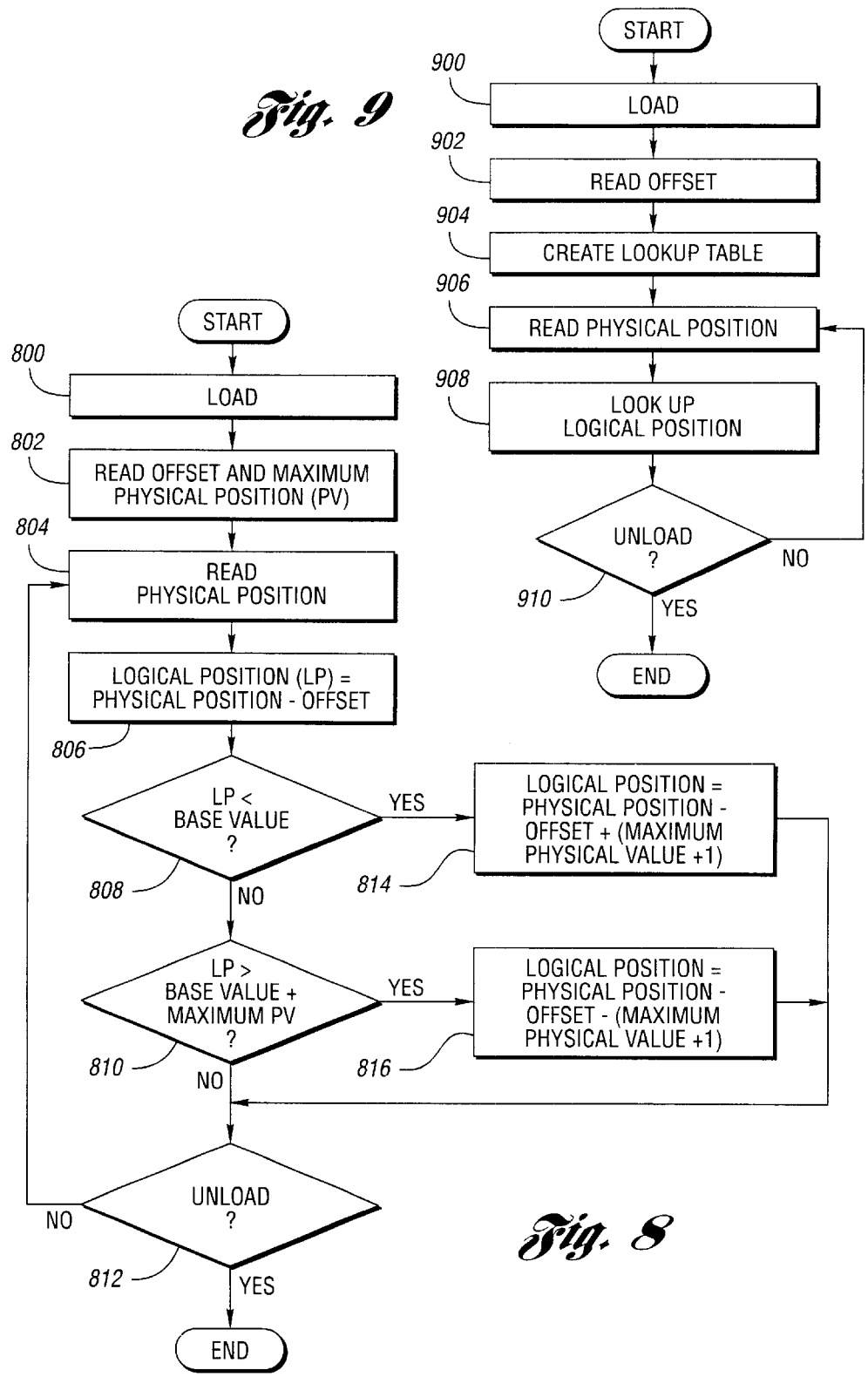

METHOD OF SYNCHRONIZING PHYSICAL AND LOGICAL POSITIONS IN A MAGNETIC TAPE RECORDING DEVICE

TECHNICAL FIELD

The present invention relates to the field of tape recording medium longitudinal position sensing.

BACKGROUND ART

Tape recording devices have a recording medium wound around one or two spools inside a housing. The medium is moved at a low speed during read and write operations, and at a higher speed during search and rewind operations. A common mechanism for estimating the longitudinal position of the medium with respect to a read-write head is a tachometer coupled to one of the spools. Linear tape movement is translated into rotational motion by the spool. The rotational motion is translated into electrical pulses by the tachometer. Counting the electrical pulses provides an approximate relative distance traveled by the medium. When referenced to one end of the tape, the relative distance traveled becomes an absolute longitudinal position.

Knowing the absolute longitudinal position of the medium is useful when searching for specific data stored at a known position. A typical search operation involves two phases. First, the medium is accelerated to the search speed to move the desired position on the medium near the read-write heads. While the medium is moving at the higher search speed, the tachometer's electrical pulses are counted to estimate the medium's longitudinal position. The second phase begins as the desired position draws near the read-write heads and the medium is slowed to the lower read-write speed. The second phase of the search operation is conducted at the low speed by reading information from the medium until the desired data is found.

The time required to complete the search operation is determined in part by the accuracy in the estimated longitudinal position of the medium. Greater estimated position accuracy during the higher search speed allows the desired location on the medium to be positioned closer to the read-write heads without overshooting. Closer positioning at high search speed results in less search time at the lower read-write speed.

One approach to improve the estimated position accuracy has been to incorporate pre-written physical positions in the medium. Typically these physical positions are written in the servo tracks in such a way that they can be read while the medium is moving at the high search speed. The numeric range and physical spacing of the physical positions are selected so that on any given tape recording device each physical position is unique. Knowing the longitudinal position of the desired data in terms of the nearest physical position allows for fast search operations.

The physical positions are normally written into the medium before the medium is cut to the proper length, wound around the spools, and installed in the housing. This causes the first physical position in each medium to have a random value. It also causes the physical positions in some tape recording devices to rollover from the highest value to the lowest value in adjacent positions. As a result, the tape drive cannot treat the physical positions as an indication of an absolute position from the end of the medium For instance, a physical position having a value of zero may be near the start of the medium, near the end of the medium, or not in the medium at all.

Randomness in the initial physical position is easily compensated for with end loaded media. The first physical position read as the medium is loaded can be used as a reference point from which all relative, or logical positions on the medium can be determined. The first physical position may be added to all relative or logical positions to convert the relative or logical positions to the actual physical positions. Alternatively, the first physical position may be subtracted from all other physical positions to convert the physical positions to the relative or logical positions.

This approach of using the first physical position read after loading the medium as a reference point does not apply when the media is first loaded at the center, or at another non-end position. The tape drive has no quick means to determine if the first physical position read after a load is truly at the physical center of the medium or not. Tolerance in the servo system of any given drive, variations from drive to drive, and random unloads can cause the medium to load at different position at each independent load operation. The tape drive could move to one end of the medium immediately after loading to read the physical position nearest that end, but doing so defeats the purpose of loading the medium at the center.

Variations in the medium load position can cause several different problems. First, the medium is usually formatted immediately after the first load. Formatting assumes that the medium was loaded at or near the true physical center. When this assumption is false then an Media Information Region (MIR)(which contains administrative data) will be formatted off-center and the medium to either side of the MIR will be of different lengths. When writing to the short side of the MIR, the physical end of the medium may be reached unexpectedly. When writing to the long side of the MIR, part of the medium may remain unused. Other problems surface on subsequent loads if the medium is loaded at different initial longitudinal positions. For example, the MIR may be missed entirely, causing the tape recording device to be interpreted as a blank tape. This may make the tape look like a scratch tape to the host system and customer data could be lost. Another problem is that data written near one end of the medium after an earlier load may be beyond the servo limits computed from the present load position. The data is still in the medium and thus can be recovered, however, performance will suffer for those tape recording devices that are loaded off-center.

In center load situations, the tape drive must assume that the medium is loaded at or very near to the center. Once loaded, an initial scan of the medium around the load position can be made to find the MIR or another recognizable information that can be used to establish a reference position. If nothing is found by the scan, either an assumption is made that the medium is blank, or time must be spent searching for one physical end of the medium.

DISCLOSURE OF INVENTION

The present invention is an improved tape storage device and methods of using the tape storage device. Existing tape storage devices have pre-written physical positions stored in the longitudinal direction of the medium. Physical positions are pre-written in the medium before the medium is cut and spooled, so the first physical position in any given tape storage device has a random value. The improvement is storing offset information in one or more locations in the tape storage device to enable a tape drive to convert the physical positions into logical positions without the need to find one physical end of the medium. Optionally, the largest value of the physical positions (called a maximum physical value) may also be stored in the tape storage device. The maximum physical value supports the physical position to logical position conversion when the physical position values undergo a rollover in mid-tape. The tape storage device may hold the conversion information in the medium, or in a nonvolatile memory embedded inside a housing that surrounds the medium.

A method of determining and storing the offset and maximum physical value information in the tape storage device is also provided by the present invention. An offset is determined by an initial physical position read immediately after the medium is loaded in the tape drive. The initial physical position will be either the physical position nearest one end of the medium, or a central physical position. To determine the maximum physical value, all of the physical positions are read and the largest value remembered. Once the conversion information has been determined, it is written into one or more locations in the medium, or into the nonvolatile memory.

The present invention includes methods of using the offset and maximum physical value information. After loading, the offset is read from the tape storage device. The maximum physical value may be a constant known to the tape drive if all compatible tape storage devices use the same physical position range of values. Alternatively, the maximum physical value may be read from the tape storage device itself, allowing different lengths of medium to use different ranges of physical positions.

All conversion methods start with the basic process that the logical positions are the physical positions minus the offset. Variations in the conversion methods are described to account for a rollover condition where the values of adjacent physical positions step between the maximum physical value and the smallest physical value. One method of rollover detection checks the change in the physical position values between the current physical position and a prior physical position. A second method performs the basic physical position to logical position conversion and then checks to see if the resulting logical positions fall between set boundaries. A third method creates a lookup table that provides a one-to-one relationship between the physical positions and logical positions.

An advantage of the improved tape storage device and associated methods is that they allow subsequent loads of the medium at random longitudinal positions. The tape drive does not have to find one physical end of the medium to establish synchronization between the physical positions and logical positions. Conversion from the physical positions to the logical positions can begin with the initial physical position read anywhere along the longitudinal length of the medium. This ability allows center loaded tape storage devices to maintain their fast initial search capability as compared to end loaded tape storage devices.

Accordingly, it is an object of the present invention to provide an improved tape storage device that stores conversion information that enables a tape drive to convert physical positions pre-written into the medium into logical positions.

Another object of the present invention is to provide a method of determining and storing the conversion information in the tape storage device.

Yet another object of the present invention is to provide a method of converting the physical positions read from the medium to logical positions, taking into account the possibility of a rollover of the physical positions at any point along the longitudinal length of the medium.

These and other objects, features and advantages will be readily apparent upon consideration of the following detailed description in conjunction with the accompanying drawings.

BRIEF DESCRIPTION OF DRAWINGS

FIG. 1 is a partial view of a medium having multiple physical positions;

FIG. 2 is a side view of a tape storage device having two spools and a nonvolatile memory;

FIG. 8 is a flow diagram of another process for converting the physical positions to the logical positions where the physical position rollover is detected by comparing the logical positions with boundaries; and FIG. 9 is a flow diagram of yet another process for converting the physical positions to the logical positions using a lookup table.

BEST MODE FOR CARRYING OUT THE INVENTION

Figure 3:
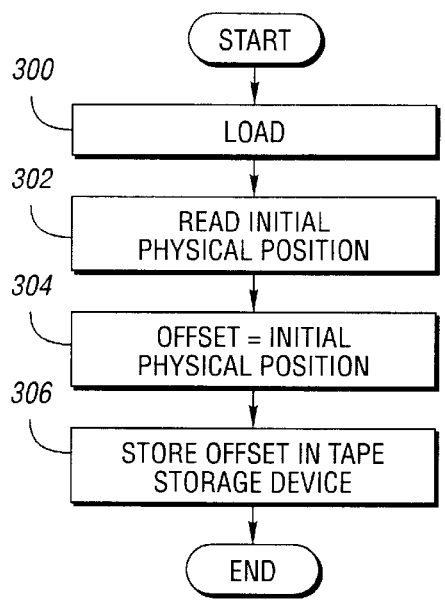
FIG. 3 is a flow diagram of a process for determining and storing an offset required for converting the physical positions to the logical positions.

The present invention is applicable to any storage device and associated drive where the medium is in the form of a tape, and has physical positions written along the longitudinal length of the medium. In the preferred embodiment, the tape storage device is a two-spool, center loading magnetic tape cartridge. Other media such as optical, metallic film, dye-polymer, bubble forming, magneto-optical, amorphous to crystalline phase transition media and the like may also be used within the tape storage device. The methods of operation described herein apply to the tape drives that reads and writes to the tape storage devices.

FIG. 1 shows a typical magnetic tape 100 having multiple physical positions 102a–102h written therein. The physical positions have values ranging from zero to a maximum physical value. During fabrication of the medium 100, the physical positions 102 are written in the medium starting from a zero value and increase incrementally. A rollover occurs when the maximum physical value is reached and the next physical position has the zero value. After the physical positions 102 are written, the medium 100 is cut to a desired length resulting in the leftmost physical position (not shown) having a random value. The range of the physical positions 102 and the longitudinal length of the medium 100 are selected such that each physical position 102 on any given cut medium 100 is unique.

When the medium 100 is first formatted, a Media Information Region (MIR) 104 is defined for storing administrative data. Administrative data includes items such as statistical and defect information. Customer data (not shown) begins a few meters beyond the MIR. The MIR may be located in the longitudinal middle of the medium 100, as shown in the example of FIG. 1, or it may be located at the starting end of the medium 100. Preferably, the MIR is located in the medium 100 so that it is readily accessible immediately after the medium 100 is loaded in a tape drive (not shown).

Physical position to logical position conversion information consisting of an offset 106 and maximum physical value 108, are stored inside the MIR in one embodiment of the present invention. The MIR is an ideal location to store the conversion information since overwriting is unlikely, and data within the MIR is readily available immediately after the medium 100 is loaded in the tape drive. Copies of the offset 106 and maximum physical value 108 may be stored at other locations in the medium 100 for redundancy purposes. For example, the offset 106 and maximum physical value 108 may be stored in the first data block of the customer's data. To account for situations where the medium 100 is loaded far away from the MIR, the offset 106 and maximum physical value 108 may be stored in the header or trailer of every data block (not shown) written into the medium 100. Having many copies of the conversion information scattered across the medium 100 increases the probability of finding at least one copy shortly after loading the medium.

The conversion information may also be stored in different places within the data volume. FIG. 2 show an example of a tape storage device 200 where the medium 100 is wound on spools 202 and 204. A housing 206 surrounds the medium 100 and spools 202 and 204. The offset and maximum physical count (not shown in this figure) are stored in a nonvolatile memory 208. Nonvolatile memory 208 is mounted in housing 206 so that it can be externally accessed when the tape storage device 200 is mounted in the tape drive (not shown).

Other variations on the tape storage device 200 may be used within the scope of the present invention. For example, the medium 100 may be mounted on a single spool with or without a surrounding housing, and end loaded onto a receiving spool inside the tape drive. This approach is commonly used for streaming tape drives. In another example, the medium 100 is a continuous loop wound on a single spool. What is important is that the offset 106 is linked to the medium 100 so that it is available to the tape drive whenever the medium 100 is loaded in that tape drive. The maximum physical value 108 may also be linked to the medium 100, or it may be stored within the tape drive itself. When the maximum physical value is stored in the tape drive, all of the media mounted in the tape drive must have the same maximum physical value.

FIG. 3 is a flow diagram of a process that determines the offset and stores the offset in the tape storage device. First, the medium is loaded into the tape drive, as shown in block 300. The tape drive then reads an initial physical position from the medium, as shown in block 302. For end loading media, the initial physical position will be the physical position nearest the loading end of the medium. For center loading media, the initial physical position should be at or near the longitudinal center of the medium. In practice, the physical positions are written approximately twenty-four millimeters apart, so it is very unlikely to find a physical position exactly at the longitudinal center of the medium. For center loading media, the initial physical position read from the medium will most likely be the first physical position immediately to the left or to the right of the longitudinal center of the medium. The manufacturer of the tape drive will choose between the left and the right side to true center. Once the initial physical position has been read, the offset is set equal to the initial physical position, as shown in block 304. The offset is then stored back into the tape storage device, as shown in block 306.

The process shown in FIG. 3 will produce an offset that aligns the initial physical position read from the medium with the origin of a logical positioning system. Table 1 shows an example where the initial physical position read has a value of eleven. Setting the offset to a value of eleven, and subtracting the offset from each physical position produces the logical positions shown in the table. Note that the logical positions include both positive values and negative values.

TABLE 1

| Offset = Initial Physical Position | | | | | | | |
|---|---|---|---|---|---|---|---|
| Physical Position | 8 | 9 | 10 | 11 | 12 | 13 | 14 |
| Logical Position | −3 | −2 | −1 | 0 | 1 | 2 | 3 |

Figure 4:
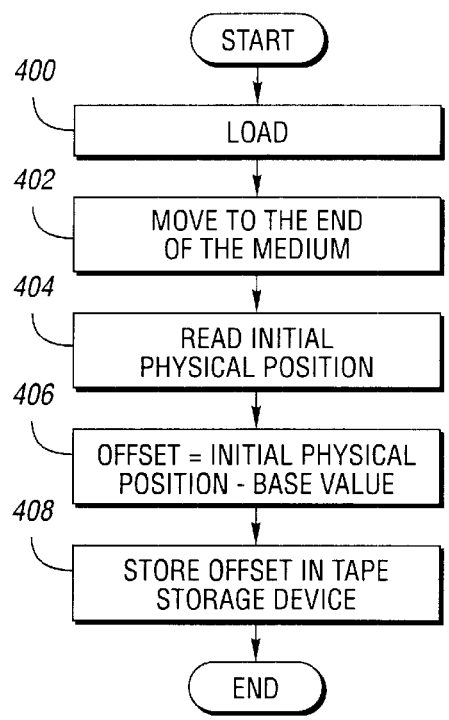
FIG. 4 is a flow diagram of another process for determining and storing the offset.

FIG. 4 is a flow diagram of another process for determining and storing the offset. After the medium is loaded, as shown in block 400, the tape drive moved to one end of the medium, as shown in block 402. The physical position nearest the one end of the medium is then read as the initial physical position, as shown in block 404. The offset is then calculated, as shown in block 406, and stored in the tape storage device, as shown in block 408. This process determines the offset differently than the process shown in FIG. 3. The offset defined by the process shown in FIG. 4 is equal to the initial physical position minus a predetermined base value. The base value determines where the initial physical position aligns with the logical zero position. When the base value has a value of zero, the offset aligns the initial physical position with the logical zero position, as shown in Table 2.

TABLE 2

| Offset = Initial Physical Position − Base Value (0) | | | | | | | |
|---|---|---|---|---|---|---|---|
| Physical Position | 8 | 9 | 10 | 11 | 12 | 13 | 14 |
| Logical Position | 0 | 1 | 2 | 3 | 4 | 5 | 6 |

Where the tape drive manufacturer prefers that the logical positions start from a value of one, the base value is set equal to one to produce the results shown in Table 3.

TABLE 3

| Offset = Initial Physical Position − Base Value (1) | | | | | | | |
|---|---|---|---|---|---|---|---|
| Physical Position | 8 | 9 | 10 | 11 | 12 | 13 | 14 |
| Logical Position | 1 | 2 | 3 | 4 | 5 | 6 | 7 |

A base value equal to negative three results in the same alignment between the physical positions and the logical positions as shown in Table 1. The base value of negative three also produces the same offset (eleven) as produced by the process shown in FIG. 3. Note, however, that the presence of a rollover can cause the processes shown in FIG. 3 and FIG. 4 to produce a different offset.

An example of a physical position rollover (physical position 15 to physical position 0) is shown in Table 4. Using the process shown in FIG. 3, the offset is equal to the initial physical position (offset=one). Using the process shown in FIG. 4, the offset is equal to the initial physical position minus the base value. Here the initial physical position has a value of fourteen and the base value is negative three producing and offset equal to seventeen. The difference in offsets is due to the placement of the rollover with respect to the initial physical position used in determining the offset. In the process shown in FIG. 3, the offset is determined by an initial physical position to the right of the rollover The process shown in FIG. 4 uses an initial physical position to the left of the rollover. As will be shown later, it may be important to the process that converts between physical positions and the logical positions known how the offset was determined.

TABLE 4

Rollover to the left of the logical zero position

| Physical Position | 14 | 15 | 0  | 1 | 2 | 3 | 4 |
|---|---|---|---|---|---|---|---|
| Logical Position  | −3 | −2 | −1 | 0 | 1 | 2 | 3 |

An advantage of the process shown in FIG. 4 as compared with the process shown in FIG. 3 is that the medium does not have to be centered before loading when determining the offset. The added cost of the process shown in FIG. 4 is the time required to find the end of the medium.

Figure 5:
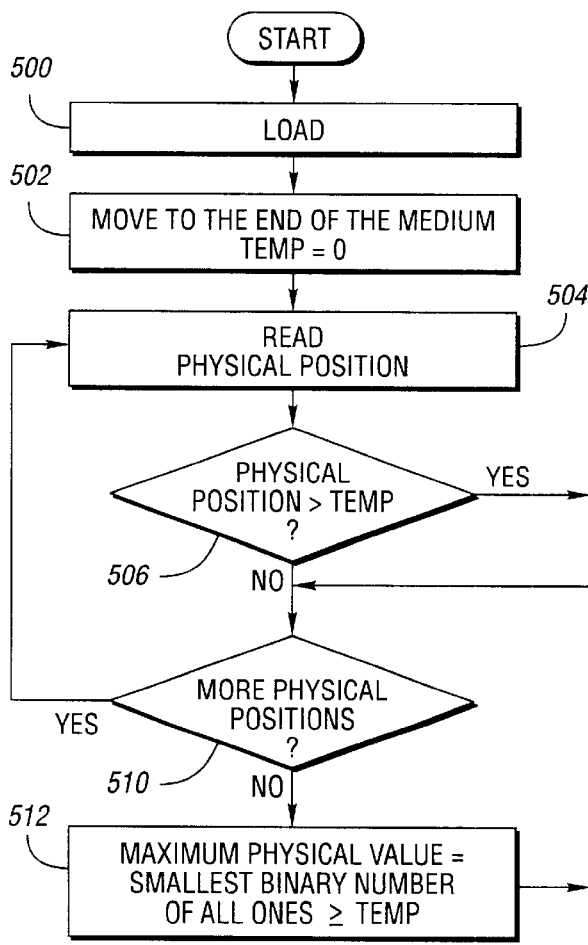
FIG. 5 is a flow diagram of a process for determining the maximum physical value of the physical positions, and storing that value in the tape storage medium.

FIG. 5 is a flow diagram of a process that determines and stores the maximum physical value. The maximum physical value is used by some of the physical position to logical position conversion methods (to be described later) to detect and/or compensate for a rollover in the physical positions. The process starts when the medium is loaded into the tape drive, as shown in block 500. Next, the tape drive moves to one end of the medium and sets a temporary variable equal to zero, as shown in block 502. The tape drive starts reading the physical positions, as shown in block 504. Each physical position is then compared with the temporary variable, as shown by decision block 506. If the physical position is greater than the temporary variable, then the temporary variable is set equal to the physical position, as shown in block 508. If the physical position is equal to or less than the temporary variable, then the next physical position is compared. The process continues comparing physical positions to the temporary variable until all of the physical values have been compared, as indicated by the "NO" branch of decision block 512. The maximum physical value is then set equal to the smallest binary number of all logical ones that is larger than the temporary variable, as shown in block 512. Finally, the maximum physical value is stored in the tape storage device, as shown in block 514.

Figure 6:
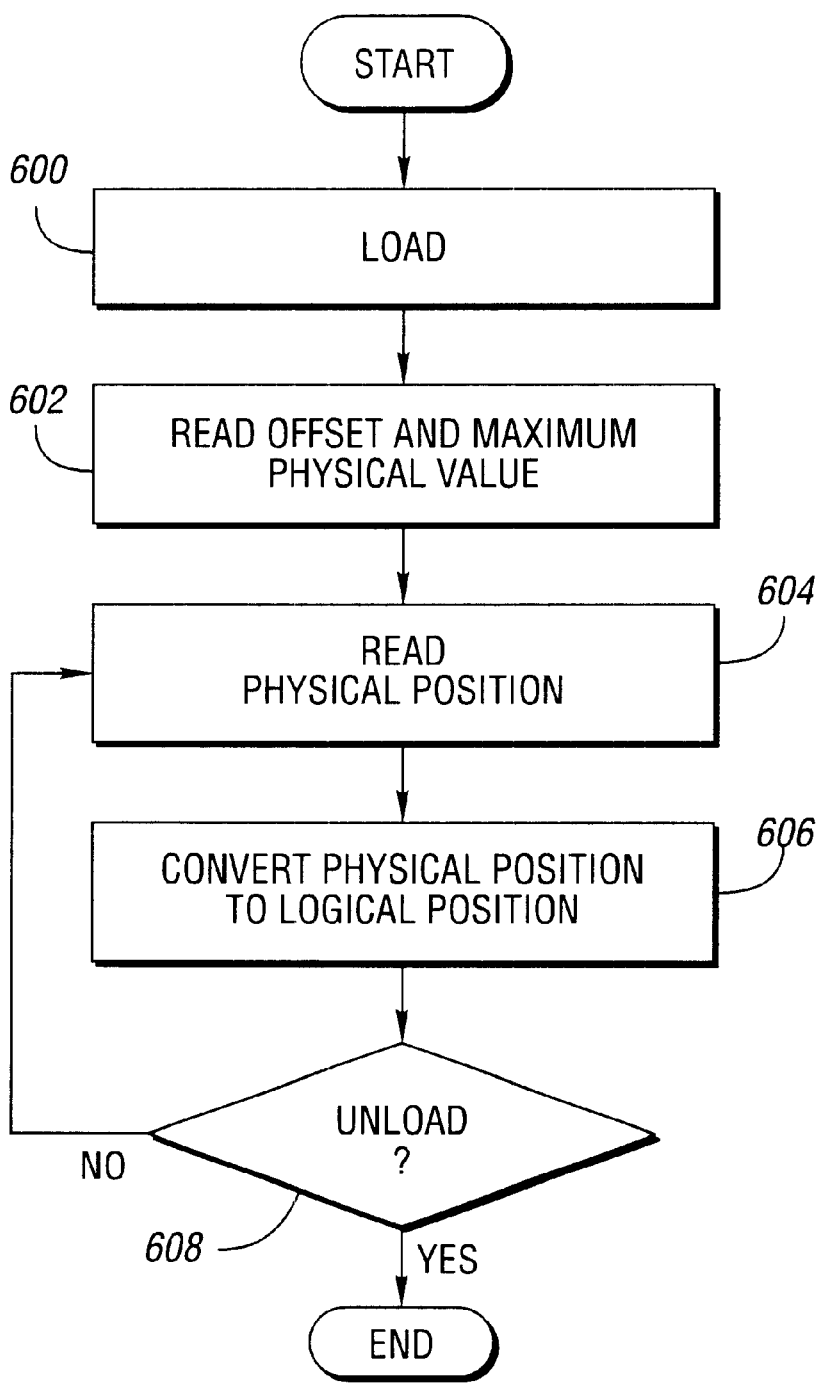
FIG. 6 is a flow diagram of a process for converting the physical positions to the logical positions.

The basic process for converting the physical positions to the logical positions is shown in FIG. 6. First, the medium is loaded into the tape drive, as shown in block 600. The offset and, if present, the maximum physical value are read from the tape storage device, as shown in block 602. As the tape drive moves the medium, it reads each physical position as it passes the read-write heads, as shown in block 604. Each physical position is then converted into a corresponding logical position using at least the offset, as shown in block 606. The process continues until the medium is unloaded, as indicated by the "YES" branch of decision block 608.

Three example processes for converting the physical positions to logical positions while considering rollovers are shown as follows. These examples are provided as illustration and are not meant to limit the present invention.

Figure 7:
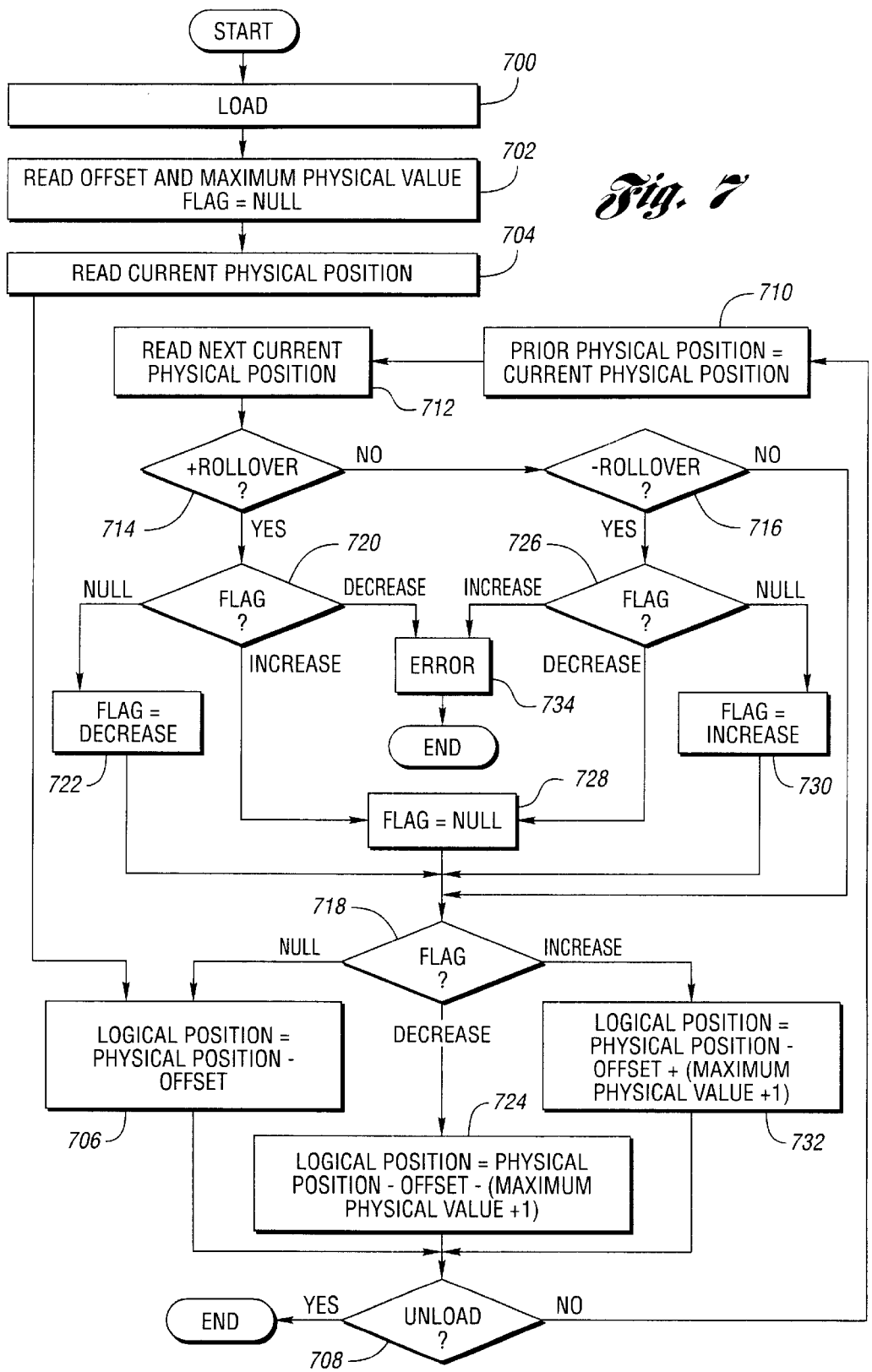
FIG. 7 is a flow diagram of a process for converting the physical positions to the logical positions where a physical position rollover is detected by comparing the current physical position with the prior physical position.

FIG. 7 is a flow diagram of a process that converts the physical positions to logical positions, and detects physical position rollovers by comparing adjacent physical positions. References will be made to the examples shown in Table 4 and Table 5 to help illustrate this process. The process starts with loading the medium, as shown in block 700. The offset and maximum physical values are read from the medium, and a flag is set to a "NULL" value, as shown in block 702. In the example shown in Table 4, the offset has a value of one, and the maximum physical value is fifteen. The first physical position is then read, as shown in block 704. The corresponding logical position is calculated as the physical position minus the offset, as shown in block 706. In the example shown in Table 4 the first physical position has a value of two and the corresponding logical position has a value of one (2−1=1).

If the medium is not unloaded, the "NO" branch in decision block 708, then the first physical position, which is also the current physical position, is remembered as a prior physical position, as shown in block 710. The next current physical position is then read, as show in block 712. In the example shown in Table 4, moving right-to-left on the medium, the next current physical position has a value of one. After the next current physical position is read, numerical difference between the current physical position and the prior physical position is checked, decision block 714, to determine if a positive rollover has taken place. In the example, the current physical position (one) minus the prior physical position (two) is a step of minus one, so no positive rollover has taken place. A second check is made, decision block 716, to determine if a negative rollover has taken place. Returning to the example, the current physical position (one) minus the prior physical position (two) is a step of minus one, so no negative rollover has taken place.

After checking for rollovers, the process continues based upon the value of the flag, as indicated by decision block 718. In the example, the flag's current value is "NULL", so the logical position corresponding to the physical position of one is equal to the physical position minus the offset (1−1=0).

Continuing to read right-to-left in the example in Table 4, the next current physical position has a value of zero, and the prior physical position now has a value of one. The step from physical position one to zero is a step of minus one, so no rollovers have taken place. The flag remains at "NULL", so the logical position corresponding to the physical position of zero is negative one (0−1=−1).

The next current physical position read has a value of fifteen and the next prior physical position has a value of zero. When the prior physical position (zero) is subtracted from the current physical position (fifteen) a step of fifteen results, indicating a positive rollover, as shown by the "YES" branch of decision block 714. Next, the value of the flag is changed from "NULL" to "DECREASE", as indicated by decision block 720 and block 722. When the flag is checked again in decision block 718, the "DECREASE" branch sends the process to block 724 where the logical position is calculated as the current physical position minus the offset and minus the sum of the maximum physical value plus one (15−1−(15+1)=−2).

If the medium is not read left-to-right, then the next current physical position read has a value of zero. Now the current physical position (zero) minus the prior physical position (fifteen) produces a step of negative fifteen. This large negative step in the physical positions is detected as a negative rollover by decision block 716. Decision block 726 and block 728 set the flag back to the "NULL" value so that decision block 718 directs the flow back to block 706 to calculate the logical position.

Table 5 shows an example where the physical position rollover is to the right of the logical zero position. Starting the process over with the initial physical position of fourteen, an offset of fourteen, and the flag having the "NULL" value, then block 706 will produce a logical position value of zero (14−14=0). Reading from left-to-right on the medium, the next current physical position read will have a value of fifteen resulting in a logical position having a value of one. On the next read the current physical position read will have a value of zero and the prior physical position will have the value of fifteen. The transition from the prior physical position (fifteen) to the current physical position (zero) is a step of negative fifteen. Decision block 716 detects this large negative step as a negative rollover, and decision block 726 and block 730 change the value of the flag from "NULL" to "INCREASE". At decision block 718, the process uses block 732 to calculate the logical position. In the present example, the logical position is equal to the physical position minus the offset, plus the sum of the maximum physical value plus one (0−14+(15+1)=2).

TABLE 5

Rollover to the right of the logical zero position

| Physical Position | 11 | 12 | 13 | 14 | 15 | 0 | 1 |
|---|---|---|---|---|---|---|---|
| Logical Position | −3 | −2 | −1 | 0 | 1 | 2 | 3 |

Should the read direction be reversed at this point, a positive rollover is detected and decision blocks 714, 720 and 728 will reset the flag to the "NULL" value.

If two successive positive rollovers, or two successive negative rollovers are detected, then upon detection of the second successive rollover, the process moves to decision block 734 where error condition is declared.

FIG. 8 is a flow diagram of another process for converting the physical positions to the logical positions. This method uses the base value as a lower boundary, and the sum of the base value and the maximum physical value as an upper boundary for valid logical positions. If a physical position is converted to a logical position outside these boundaries, then the logical position is adjusted up or down accordingly. Examples shown in Table 6 and Table 7 are used to illustrate this process.

TABLE 6

Rollover to the left of the logical zero position
Offset = 2, Base Value = −3, Maximum Physical Value = 15

| Physical Position | 14 | 15 | 0 | 1 | 2 | 3 | 4 | 5 | 6 |
|---|---|---|---|---|---|---|---|---|---|
| Logical Position | −4 | −3 | −2 | −1 | 0 | 1 | 2 | 3 | −4 |

TABLE 7

Rollover to the right of the logical zero position
Offset = 29, Base Value = −4, Maximum Physical Value = 31

| Physical Position | 25 | 26 | 27 | 28 | 29 | 30 | 31 | 0 | 1 |
|---|---|---|---|---|---|---|---|---|---|
| Logical Position | −4 | −3 | −2 | −1 | 0 | 1 | 2 | 3 | 4 |

The process starts with the loading of the medium, as shown in block 800. The offset and maximum physical value are then read from the tape storage device, as shown in block 802. Each physical position read, as indicated by block 804, is converted into a logical position using only the offset, as shown in block 806. If the resulting logical position (LP) is greater than the base value, the "NO" branch of decision block 808, and less than the sum of the base value plus the maximum physical value (PV), the "NO branch of decision block 810, then the logical position is valid and is used by the tape drive as-is. This process is repeated until the medium is unloaded, the "YES" branch of decision block 812.

For the example shown in Table 6, the physical position having the value of four produces a logical position having a value of two. The logical position value of two is greater than the base value of negative three, and less than the sum of the base value plus the maximum physical value (−3+15=12) so it is within the boundaries. For the example shown in Table 7, the physical position having the value of twenty-seven produces a logical position of negative two. The logical position value of negative two is greater than the base value of negative four, and less than the sum of the base value plus the maximum physical value (−4+31=27) so it too is within the boundaries.

Now consider the physical position in Table 7 having the value of one. The resulting logical position provided by block 806 would be negative twenty-eight. (1−29=−28). Negative twenty-eight is less than the base value of negative four so the logical position is below the lower boundary. To bring this logical position back withing the boundaries, it is increased by the sum of the maximum physical value plus one (1−29+(31+1)=4).

Returning to the example shown in Table 6, the physical position having the value of fifteen produces a logical position having a value of thirteen (15−2=13). Thirteen is greater than the base value of negative three, but it is also greater than the sum of the base value plus the maximum physical value (−3+15=12). As a result, this logical position is decreased by the sum of the maximum physical value plus one, as shown in block 816 (15−2−(15+1)=−3) to bring it back within the boundaries.

FIG. 9 is a flow diagram of yet another process for converting the physical positions to the logical positions. This process works by reading the offset from the medium after the medium is loaded, as indicated by blocks 902 and 900. From the offset, a lookup table is created, as indicated by block 904. Afterwards, each physical position read from the medium, block 906, is translated by the lookup table to determine the corresponding logical position, as shown in block 908. As with the other processes, the conversion continues until the medium is unloaded, as indicated by the "YES" branch of decision block 910.

Generation of the lookup table depends upon the process used to determine the offset. The first lookup table generation process corresponds to the process shown in FIG. 3 where the offset is determined by the initial physical position read in the center of the medium. First, the logical zero position is placed in the lookup table at an input address equal to the offset, as shown in Table 8.

TABLE 8

| Offset = 5 | |
|---|---|
| Input Address = Physical Position | Logical Position |
| 7 | |
| 6 | |
| 5 | 0 |
| 4 | |
| 3 | |
| 2 | |
| 1 | |
| 0 | |

The entries at input addresses above the offset address are filled with increasing positive values, and the entries at input addresses below the offset address are filled with decreasing negative values. Wraparound is performed at the ends of the lookup table. The last entry between the highest logical position value and the lowest logical position value may be left blank, as shown in Table 9

TABLE 9

Offset = 5

| Input Address = Physical Position | Logical Position |
|---|---|
| 7 | 2 |
| 6 | 1 |
| 5 | 0 |
| 4 | −1 |
| 3 | −2 |
| 2 | −3 |
| 1 | blank |
| 0 | 3 |

When the offset is determined by the process shown in FIG. 4, the initial physical position aligns with the logical position having the base value, then the lookup table must be created in a different manner. Here, the first entry into the lookup table has a value equal to the base value, and is inserted in the lookup table where the input address equals the sum of the offset plus the base value. (The offset plus the base value equal the initial physical position read after moving to the end of the medium.) An example is shown in Table 10 where the offset equals nine and the base value equals negative three, so the base value (−3) is entered where the input address equals six (9+(−3)=6).

TABLE 10

Offset = 9, Base Value = −3

| Input Address = Physical Position | Logical Position |
|---|---|
| 7 | |
| 6 | −3 |
| 5 | |
| 4 | |
| 3 | |
| 2 | |
| 1 | |
| 0 | |

Starting from where the input address equals the sum of the offset plus the base value, the entries are incremented moving up in the lookup table. Wraparound is performed from the top the table to the bottom if necessary. The resulting lookup table is shown in Table 11.

TABLE 11

Offset = 9, Base Value = −3

| Input Address = Physical Position | Logical Position |
|---|---|
| 7 | −2 |
| 6 | −3 |
| 5 | 4 |
| 4 | 3 |
| 3 | 2 |
| 2 | 1 |
| 1 | 0 |
| 0 | −1 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An improved tape recording device having a plurality of physical positions stored in a medium, the improvement comprising:
    an offset value stored in at least one location in the tape recording device to synchronize the plurality of physical positions with a plurality of logical positions respectively; and
    a maximum physical value stored in at least one location in the tape recording device for use in synchronizing the plurality of physical positions with the plurality of logical positions.

2. The improved tape recording device of claim 1 wherein the tape recording device includes a housing, the improvement further comprising a nonvolatile memory disposed in the housing and storing the offset value.

3. The improved tape recording device of claim 1 wherein the offset value is stored in the medium.

4. The improved tape recording device of claim 1 wherein the tape recording device includes a housing, the improvement further comprising a nonvolatile memory disposed in the housing and storing the maximum physical value.

5. The improved tape recording device of claim 1 wherein the maximum physical value is stored in the medium.

6. The improved tape recording device of claim 1 wherein the medium is selected from a group of media consisting of magnetic media, optical media, metallic film media, dye-polymer media, bubble forming media, magneto-optical, and amorphous to crystalline phase transition media.

7. A method of operating a tape drive to store an offset value in a tape recording device, wherein the offset value synchronizes a plurality of logical positions with a plurality of physical positions stored in a medium of the tape recording device, the method comprising:
    loading the tape recording device into the tape drive;
    reading an initial physical position in response to loading the tape recording device into the tape drive;
    generating the offset value equal to the initial physical position;
    storing the offset value in at least one location in the tape recording device; and
    storing a maximum physical value in at least one location in the tape recording device after loading the tape recording device into the tape drive.

8. The method of claim 7 further comprising:
    reading the plurality of physical positions stored in the medium after loading the tape recording device into the drive;
    remembering a largest physical position of the plurality of physical positions read from the medium; and
    setting a maximum physical value equal to a smallest binary number having all logical ones that is at least as large as the largest physical position after reading the plurality of physical positions from the medium.

9. A method of operating a tape drive to store an offset value in a tape recording device, wherein the offset value synchronizes a plurality of logical positions with a plurality of physical positions stored in a medium of the tape recording device, a base value defines a lowest value of the plurality of logical positions, and the plurality of physical positions generally increase as seen moving from a first end of the medium to a second end of the medium, the method comprising:

loading the tape recording device into the tape drive;
moving with the tape drive to the first end of the medium;
reading a first physical position nearest the first end of the medium after moving to the first end of the medium;
generating the offset value equal to a difference of the first physical position minus the base value; and
storing the offset value in at least one location in the tape recording device.

10. The method of claim 9 further comprising storing a maximum physical value in at least one location in the tape recording device after loading the tape recording device into the tape drive.

11. The method of claim 10 further comprising:
reading the plurality of physical positions stored in the medium after loading the tape recording device into the drive;
remembering a largest physical position of the plurality of physical positions read from the medium; and
generating a maximum physical value equal to a smallest binary number having all logical ones that is at least as large as the largest physical position.

12. A method of operating a tape drive to synchronize a plurality of logical positions with a plurality of physical positions stored in a medium of a tape recording device based upon an offset value stored in the tape recording device, the method comprising:
loading the tape recording device into the tape drive;
reading the offset value from the tape recording device subsequent to loading the tape recording device into the tape drive;
reading at least one physical position of the plurality of physical positions from the medium subsequent to loading the tape recording device into the tape drive; and
converting each physical position of the at least one physical position to a respective one logical position of the plurality of logical positions based upon the offset value in response to reading the offset value and the at least one physical position;
wherein a maximum physical value defines a highest value of the plurality of physical positions, and the at least one physical position is at least two physical positions, the converting of the at least one physical position to at least one logical position comprises:
initializing a flag to a null value in response to loading the tape recording device into the tape drive;
comparing a prior physical position of the at least two physical positions with a current physical position of the at least two physical positions to detect in the alternative a positive rollover or a negative rollover in the plurality of physical positions in response to reading the at least two physical positions;
setting the flag to an increase value in response to detecting the negative rollover when the flag has the null value;
setting the flag to a decrease value in response to detecting the positive rollover when the flag has the null value;
setting the flag to the null value in response to detecting the positive rollover when the flag has the increase value;
setting the flag to the null value in response to detecting the negative rollover when the flag has the decrease value;
offsetting the current physical position by the offset value to obtain the respective one logical position when the flag has the null value;
offsetting the current physical position by the offset value plus the maximum physical value plus one to obtain the respective one logical position when the flag has the increase value; and
offsetting the current physical position by the offset value minus the maximum physical value minus one to obtain the respective one logical position when the flag has the decrease value.

13. The method of claim 12 further comprising reading the maximum physical value from the tape recording device in response to loading the tape recording device into the tape drive.

14. A method of operating a tape drive to synchronize a plurality of logical positions with a plurality of physical positions stored in a medium of a tape recording device based upon an offset value stored in the tape recording device, the method comprising:
loading the tape recording device into the tape drive;
reading the offset value from the tape recording device subsequent to loading the tape recording device into the tape drive;
reading at least one physical position of the plurality of physical positions from the medium subsequent to loading the tape recording device into the tape drive; and
converting each physical position of the at least one physical position to a respective one logical position of the plurality of logical positions based upon the offset value in response to reading the offset value and the at least one physical position;
wherein a base value defines a lowest value of the plurality of logical positions and a maximum physical value defines a highest value of the plurality of physical positions, the converting of the at least one physical position to at least one logical position comprises:
offsetting each physical position of the at least one physical position by the offset value to obtain the respective logical position;
comparing each logical position with the base value in response to offsetting to determine if each logical position is less than the lowest value allowed;
increasing each logical position that is less than the base value by a first sum of the maximum physical position plus one in response to comparing the at least one logical position with the base value;
comparing each logical position with a second sum of the base value plus the maximum physical value in response to offsetting to determine if each logical position is greater than the highest value allowed; and
decreasing each logical position that is greater than the second sum of the base value plus the maximum physical value by the first sum of the maximum physical value plus one.

15. The method of claim 14 further comprising reading the maximum physical value from the tape recording device in response to loading the tape recording device into the tape drive.

16. A method of operating a tape drive to synchronize a plurality of logical positions with a plurality of physical positions stored in a medium of a tape recording device based upon an offset value stored in the tape recording device, the method comprising:
loading the tape recording device into the tape drive;
reading the offset value from the tape recording device subsequent to loading the tape recording device into the tape drive;

reading at least one physical position of the plurality of physical positions from the medium subsequent to loading the tape recording device into the tape drive;

converting each physical position of the at least one physical position to a respective ore logical position of the plurality of logical positions based upon the offset value in response to reading the offset value and the at least one physical position, wherein the converting of the at least one physical position to at least one logical position comprises entering each physical position of the at least one physical position into the input address of the lookup table to obtain the respective one logical position;

providing a lookup table having an input address, the lookup table storing the plurality of logical positions such that a logical position of the plurality of logical positions having a value equal to zero is stored where the input address equals the offset value, and reading a maximum physical value from the tape recording device in response to loading the tape recording device into the tape drive.

17. A method of operating a tape drive to synchronize a plurality of logical positions with a plurality of physical positions stored in a medium of a tape recording device based upon an offset value stored in the tape recording device, the method comprising:

loading the tape recording device into the tape drive;

reading the offset value from the tape recording device subsequent to loading the tape recording device into the tape drive;

reading at least one physical position of the plurality of physical positions from the medium subsequent to loading the tape recording device into the tape drive; and converting each physical position of the at least one physical position to a respective one logical position of the plurality of logical positions based upon the offset value in response to reading the offset value and the at least one physical position;

wherein the plurality of physical positions generally increase as seen moving from a first end of the medium to a second end of the medium, a maximum physical value defines a highest value of the plurality of physical positions, and the at least one physical position is at least two physical positions, the converting of the at least one physical position to at least one logical position comprises:

initializing a flag to a null value in response to loading the tape recording device into the tape drive;

moving tape to the first end of the medium before reading the at least two physical positions;

comparing a prior physical position of the at least two physical positions with a current physical position of the at least two physical positions to detect in the alternative a positive rollover or a negative rollover in the plurality of physical positions in response to reading the at least two physical positions;

setting the flag to an increase value in response to detecting the negative rollover when the flag has the null value;

setting the flag to the null value in response to detecting the positive rollover when the flag has the increase value;

offsetting the current physical position by the offset value to obtain the respective one logical position when the flag has the null value; and offsetting the current physical position by the offset value plus the maximum physical value plus one to obtain the respective one logical position when the flag has the increase value.

18. The method of claim 17 further comprising reading the maximum physical value from the tape recording device in response to loading the tape recording device into the tape drive.

19. A method of operating a tape drive to synchronize a plurality of logical positions with a plurality of physical positions stored in a medium of a tape recording device based upon an offset value stored in the tape recording device, the method comprising:

loading the tape recording device into the tape drive;

reading the offset value from the tape recording device subsequent to loading the tape recording device into the tape drive;

reading at least one physical position of the plurality of physical positions from the medium subsequent to loading the tape recording device into the tape drive; and converting each physical position of the at least one physical position to a respective one logical position of the plurality of logical positions based upon the offset value in response to reading the offset value and the at least one physical position;

wherein a base value defines a lowest value of the plurality of logical positions and a maximum physical value defines a highest value of the plurality of physical positions, the converting of the at least one physical position to at least one logical position comprises:

offsetting each physical position of the at least one physical position by the offset value to obtain the respective logical position;

comparing each logical position with the base value in response to offsetting to determine if each logical position is less than the lowest value allowed; and increasing each logical position that is less than the base value by a first sum of the maximum physical position plus one in response to comparing the at least one logical position with the base value.

20. The method of claim 19 further comprising reading the maximum physical value from the tape recording device in response to loading the tape recording device into the tape drive.

21. A method of operating a tape drive to synchronize a plurality of logical positions with a plurality of physical positions stored in a medium of a tape recording device based upon an offset value stored in the tape recording device, the method comprising:

loading the tape recording device into the tape drive, reading the offset value from the tape recording device subsequent to loading the tape recording device into the tape drive;

reading at least one physical position of the plurality of physical positions from the medium subsequent to loading the tape recording device into the tape drive; and converting each physical position of the at least one physical position to a respective one logical position of the plurality of logical positions based upon the offset value in response to reading the offset value and the at least one physical position;

wherein a base value defines a lowest value of the plurality of logical positions, the method further comprises providing a lookup table having an input address, the lookup table storing the plurality of logical positions such that a logical position of the plurality of logical positions having a value equal to the base value is stored where the input address equals a sum of the offset value plus the base value, and wherein the converting of the at least one physical position to at least one logical position comprises entering each physical position of the at least one physical position into the input address of the lookup table to obtain the respective one logical position.

22. The method of claim 21 further comprising reading the maximum physical value from the tape recording device in response to loading the tape recording device into the tape drive.

* * * * *